US006858552B2

United States Patent
Peuchert

(10) Patent No.: US 6,858,552 B2
(45) Date of Patent: Feb. 22, 2005

(54) ALKALI-FREE ALUMINOBOROSILICATE GLASSES AND USES THEREOF

(75) Inventor: Ulrich Peuchert, Bodenheim (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/024,498

(22) Filed: Dec. 21, 2001

(65) Prior Publication Data

US 2002/0183188 A1 Dec. 5, 2002

(30) Foreign Application Priority Data

Dec. 22, 2000 (DE) .......................... 100 64 804

(51) Int. Cl.$^7$ .............................. C03C 3/091
(52) U.S. Cl. ............... 501/66; 501/65; 501/67
(58) Field of Search ................. 601/65–67

(56) References Cited

U.S. PATENT DOCUMENTS

| | | | | |
|---|---|---|---|---|
| 5,801,109 A | * | 9/1998 | Nishizawa et al. | 501/66 |
| 6,417,124 B1 | * | 7/2002 | Peuchert et al. | 501/66 |
| 6,465,381 B1 | * | 10/2002 | Lautenschläger et al. | 501/56 |
| 6,468,933 B1 | * | 10/2002 | Narita et al. | 501/67 |
| 6,537,937 B1 | * | 3/2003 | Nishizawa et al. | 501/66 |

FOREIGN PATENT DOCUMENTS

| | | | |
|---|---|---|---|
| DE | 196 01 922 | * | 7/1997 |
| EP | 1078893 | | 2/2001 |
| JP | 09156953 | | 10/1997 |

OTHER PUBLICATIONS

English Translation of Federal Republic of Germany patent publication DE 196 01 922 A1.*
Patent Abstract of Japan, Publication No. 09156953, Publication Date Jun. 17, 1997, Applicant: Nippon Electric Glass Co., Ltd.

* cited by examiner

*Primary Examiner*—Michael Marcheschi
*Assistant Examiner*—Elizabeth A. Bolden
(74) *Attorney, Agent, or Firm*—Millen, White, Zelano & Branigan, P.C.

(57) ABSTRACT

The invention relates to an alkali-free aluminoborosilicate glass having a coefficient of thermal expansion $\alpha_{20/300}$ of between 2.8 and 3.9·10$^{-6}$/K, which has the following composition (in % by weight, based on oxide): $SiO_2$>58–65, $B_2O_3$>6–11.5; $Al_2O_3$>14–20, MgO>3–6, CaO>4.5–10, SrO 0–<1.5, BaO>1.5–6, or SrO 0–<4, BaO >2.5–6, respectively, with SrO+BaO>3, ZnO 0–<2, and which is highly suitable for use as a substrate glass both in display technology and in thin-film photovoltaics.

36 Claims, No Drawings

ALKALI-FREE ALUMINOBOROSILICATE GLASSES AND USES THEREOF

The invention relates to alkali-free aluminoborosilicate glasses. The invention also relates to uses of these glasses.

Demanding requirements are made on glasses for applications as substrates in flat-panel liquid-crystal display technology, for example in TN (twisted nematic)/STN (supertwisted nematic) displays, active matrix liquid crystal displays (AMLCDs), thin film transistors (TFTs) or plasma addressed liquid crystals (PALCs). Besides high thermal shock resistance and good resistance to the aggressive chemicals employed in the process for the production of flat-panel screens, the glasses should have high transparency over a broad spectral range (VIS, UV) and, in order to weight less, a low density. The use of glasses as substrate material for integrated semiconductor circuits, for example in TFT displays ("chip on glass") in addition requires thermal matching to the thin-film material silicon which is usually deposited on the glass substrate in the form of amorphous silicon (a-Si) at low temperatures of up to 300° C. The amorphous silicon is partially recrystallized by subsequent heat treatment at temperatures of about 600° C. Owing to the a-Si fractions, the resulting, partially crystalline poly-Si layer is characterized by a thermal expansion coefficient of $\alpha_{20/30} \cong 3.7 \times 10^{-6}$/K. Depending on the a-Si/poly-Si ratio, the thermal expansion coefficient $\alpha_{20/300}$ may vary between $2.9 \cdot 10^{-6}$/K and $4.2 \cdot 10^{-6}$/K. When virtually crystalline Si layers are generated by high temperature treatments above 700° C. or direct deposition by CVD processes, which is desired in thin-film photovoltaics, a substrate is required which has a significantly reduced thermal expansion of $3.2 \times 10^{-6}$/K or less. In view of the production of large-area glass substrates, these glasses must have high mechanical strength. The E modulus is a measure of this strength.

In addition, applications in display and photovoltaics technology require the absence of alkali metal ions. Sodium oxide levels of less than 1500 ppm, as a result of production, are acceptable in view of the "poisoning" action due to diffusion of $Na^+$ into the semiconductor layer.

According to the invention, it is possible to produce suitable glasses economically on a large industrial scale with acceptable quality (no bubbles, knots, inclusions), for example, in a float plant or by drawing methods. The production of thin (<1 mm) streak-free substrates with low surface undulation by drawing methods requires high devitrification stability of the glasses. Compaction of the substrate during production, in particular in the case of TFT displays, which has a disadvantageous effect on the semiconductor microstructure, can be countered by establishing a suitable temperature-dependent viscosity characteristic line of the glass. The glasses should have a sufficiently high glass transition temperature with respect to thermal process and shape stability, i.e. $T_g \geq 690°$ C., while on the other hand not having excessively high melting and processing ($V_A$) temperatures, i.e. a $V_A$ of $\leq 1350°$ C.

The requirements made on glass substrates for LCD display technology or thin-film photovoltaics technology are also described in "Glass substrates for AMLCD applications: properties and implications" by J. C. Lapp, SPIE Proceedings, Vol. 3014, invited paper (1997), and in "Photovoltaik—Strom aus der Sonne" by J. Schmid, Verlag C. F. Müller, Heidelberg 1994, respectively.

The above-mentioned requirement profile is fulfilled best by alkaline earth metal aluminoborosilicate glasses. However, the known display or solar cell substrate glasses described in the following publications still have disadvantages and do not meet the full list of requirements.

The following documents describe glasses having low MgO and/or CaO contents: JP 2000 001 331 A, JP 2000 044 278 A, DE 198 40 113 A1, WO 00/32528, JP 9-169 538 A, JP 4-160 030 A, JP 9-100 135 A, U.S. Pat. No. 5,374,595, JP 9-48632 A, JP 8-295530 A, WO 97/11919, WO 97/11920 and JP 9110460 A1. These glasses do not have the desired meltability, which is evident from viscosities of $10^2$ dPas and $10^4$ dPas, at very high temperatures while having a relatively high density. The same is true for the MgO-free glasses of DE 37 30 410 A1, U.S. Pat. No. 5,116,787 and U.S. Pat. No. 5,116,789. The absence of MgO or excessively low MgO content results in low mechanical strength.

On the other hand, glasses having high MgO contents, as described in JP 61-123 536 A, are insufficient in terms of their chemical resistance and their devitrification and segregation characteristics.

The glasses described in WO 98/27019 contain very little BaO and SrO and are likewise susceptible to crystallization. The same is true for the glasses described in EP 714 862 B1 which have a relatively low BaO content.

Glasses having a high content of the heavy alkaline earth metal oxides BaO and/or SrO, as described in EP 341313 B1, have undesirably high densities and poor meltabilities. The same is true for the glasses of JP 10-72237 A.

Glasses having low boric acid contents described in JP 10-45422 A and JP 9-263421 A exhibit excessively high melting temperatures, or excessively high viscosities at the melt and processing temperatures. Moreover, glasses of this type have a high devitrification tendency when combined with low BaO contents.

In contrast, glasses having high boric acid contents, as described, for example, in U.S. Pat. No. 4,824,808, have insufficient heat resistance and chemical resistance, in particular to hydrochloric acid solutions.

Glasses having a relatively low $SiO_2$ content do not have a sufficiently high chemical resistance either, in particular when they contain relatively large amounts of $B_2O_3$ and/or MgO and are low in alkaline earth metals. Such glasses are described in WO 97/11919 and EP 672 629 A2. The relatively $SiO_2$-rich glass variants described in the latter document have low $Al_2O_3$ levels, which is disadvantageous because of the crystallization behavior of those glasses.

DE 42 13 579 describes glasses for TFT applications having a coefficient of thermal expansion of $<5.5 \times 10^{-6}$/K, according to the examples described therein, of $\geq 4.0 \times 10^{-5}$/K. These glasses have relatively high $B_2O_3$ levels and relatively low $SiO_2$ contents, but do not have a high chemical resistance, in particular to diluted hydrochloric acid.

DE 196 01 022 A1 describes glasses which are selected from a very wide composition range and which must contain $ZrO_2$ and SnO. These glasses tend to exhibit glass defects because of their $ZrO_2$ levels.

DE 196 17 344 C1 in the name of the Applicant, discloses alkali-free, tin oxide-containing, low-$SiO_2$, high-$Al_2O_3$ glasses having a coefficient of thermal expansion, $\alpha_{20/300}$, of about $3.7 \cdot 10^{-6}$/K and very good chemical resistance. They are suitable for use in display technology. However, they are not ideal, in particular for processing in a float plant, since they must contain ZnO. At higher ZnO contents (>1.5% by weight), there is a risk of forming of ZnO deposits on the glass surface by evaporation and subsequent condensation in the hot-shaping range. The same is true for the tin oxide-containing, barium-free or low-barium glasses described in DE 196 03 698 C1 in the name of the Applicant.

JP 9-156 953 A also discloses alkali-free glasses for display technology which are low in $Al_2O_3$ and in particular low in $B_2O_3$. The heat resistance of these glasses is insufficient, which is evident from the glass transition temperatures of the exemplary glasses.

In the unexamined Japanese publications JP 10-25132 A, JP 10-114538 A, JP 10-130034 A, JP 10-59741 A, JP 10-324526 A, JP 11-43350 A, JP 10-139467 A, JP 10-231139 A and JP 11-49520 A, mention is made of very wide composition ranges for display glasses, which can be varied by means of many optional components and which are admixed with one or more specific refining agents in each case. These documents however do not indicate how glasses having the complete requirement profile described above can be obtained specificly.

It is an object of the present invention to provide glasses which meet the physical and chemical requirements imposed on glass substrates for liquid-crystal displays, in particular for TFT displays, and for thin-film solar cells, specifically on the basis of $\mu$c-Si, high heat resistance, a favorable processing range and sufficient devitrification stability.

The glasses according to the invention contain between >58 and 65% by weight of $SiO_2$. At lower contents, the chemical resistance is impaired, while at higher levels, the thermal expansion is too low and the crystallization tendency of the glasses increases. Preference is given to a minimum content of 60% by weight.

The glasses contain from >14 to 20% by weight of $Al_2O_3$. $Al_2O_3$ has a positive effect on the heat resistance of the glasses without excessively increasing the processing temperature. The $Al_2O_3$ contents described above provide for a high heat resistance. At lower contents, the glasses become more susceptible to crystallization.

The $B_2O_3$ content is restricted to a maximum of 11.5% by weight in order to achieve a high glass transition temperature, $T_g$. Higher contents would impair the chemical resistance. The $B_2O_3$ content is higher than 6% by weight to ensure that the glass has good meltability and good crystallization stability. Preference is given to a $B_2O_3$ content of more than 7% by weight and a maximum of 11% by weight.

Essential glass components are the network-modifying alkaline earth metal oxides. A coefficient of thermal expansion, $\alpha_{20/300}$, of $2.8 \cdot 10^{-6}$/K to $3.9 \cdot 10^{-6}$/K is achieved by varying the levels of the said alkaline earth metal oxides. The glasses contain >3 to 6% by weight of MgO and >4.5 to 10% by weight of CaO. High levels of these two components have a positive effect on low density and low processing temperature, whereas low levels favor crystallization stability and chemical resistance. The MgO level is preferably lower than the CaO level by weight. The MgO/CaO ratio by weight is <1, preferably $\leq 0.7$. Preference is given to a maximum MgO content of 5% by weight and to a minimum CaO content of 5% by weight.

The glasses contain at least >1.5% by weight BaO. The maximum BaO content is limited to 6.0% by weight, preferably to 5.0% by weight. This ensures good meltability and keeps the density low. Preference is given to a minimum BaO content of >2.5% by weight. This increases the crystallization stability.

The glasses may furthermore contain up to <4% by weight, preferably up to 3% by weight, the relatively heavy alkaline earth metal oxide SrO. Limitation of this optional component to a maximum of <4% by weight is advantageous to ensure good meltability and a high chemical resistance. To achieve a very low density, the SrO content is perferably limited to a maximum of 1.5% by weight. Thus, glasses having a very low density are obtained by using BaO contents of >1.5% by weight in the case of glasses having no or low SrO content, i.e., glasses having an SrO content of 0–1.5% by weight.

Glasses having relatively high BaO contents of >2.5% by weight exhibit particulary high crystallization stability at SrO contents of 0 to <4% by weight, preferably up to 3% by weight.

The total content of BaO and SrO together in these two groups of glasses is at least >3% by weight. This ensures sufficient crystallization stability. SrO and BaO have a positive effect on HCl resistance of the glasses and they also reduce the refractive index of the glasses when comparing the effect of MgO and CaO in the glasses. Preference is given to glasses having a total alkaline earth metal content (MgO+CaO+SrO+BaO) of more than 11% by weight.

The glasses may contain up to <2% by weight of ZnO, preferably up to 0.5% by weight of ZnO. The network modifier ZnO has a structure-loosening function and has less effect on the thermal expansion than the alkaline earth metal oxides. Its effect on the viscosity characteristic line is similar to that of $B_2O_3$. In the case of processing the glass by the float process, the ZnO level is preferably limited to a maximum of 1.5% by weight. Higher levels would increase the risk of unwanted ZnO deposits on the glass surface which may form by evaporation and subsequent condensation in the hot-shaping range.

The glasses are alkali-free. The term "alkali-free" as used herein means that it is essentially free from alkali metal oxides, although it can contain impurities of less than 1500 ppm.

The glasses may contain up to 2% by weight of $ZrO_2$ and $TiO_2$ each. $ZrO_2$ advantageously increases the heat resistance of the glass. Owing to its low solubility, $ZrO_2$ does, however, increase the risk of $ZrO_2$-containing melt relicts, so-called zirconium nests, in the glass. The $ZrO_2$ content is therefore preferably only up to 0,5% by weight, and particularly preferably no $ZrO_2$ is added. Low $ZrO_2$ contents originating from corrosion of zirconium-containing trough material are not problematic. $TiO_2$ advantageously reduces the solarization tendency, i.e. the reduction in transmission in the visible wavelength region because of UV-VIS radiation. At contents of greater than 2% by weight, color casts can occur due to complex formation with $Fe^{3+}$ ions which are typically present in the glass at low levels as impurities. The $TiO_2$ level is preferably only up to 0.5% by weight.

The glasses may contain refining agents. They may, for example, contain up to 1.5% by weight of $As_2O_3$, $Sb_2O_3$, $SnO_2$ and/or $CeO_2$. It is likewise possible to add 1.5% by weight each of $Cl^-$ (for example in the form of $BaCl_2$), $F^-$ (for example in the form of $CaF_2$) or $SO_4^{2-}$ (for example in the form of $BaSO_4$). The sum of $As_2O_3$, $Sb_2O_3$, $CeO_2$, $SnO_2$, $Cl^-$, $F^-$ and $SO_4^{2-}$ should, however, not exceed 1.5% by weight.

If the refining agents $As_2O_3$ and $Sb_2O_3$ are omitted, the glasses can be processed not only by various drawing methods, but also by the float method. In an easy batch preparation, for example, it is advantageous to omit both $ZrO_2$ and $SnO_2$. Glasses having the property profile described above, in particular, high heat and chemical resistance and low crystallization tendency, are still obtainable even without the presence of $ZrO_2$ and $SnO_2$.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents and publications, cited above or below, and of corresponding German application No. 10064804.5, filed Dec. 22, 2000 is hereby incorporated by reference.

EXAMPLES

Glasses were produced in Pt/Ir crucibles at 1620° C. from conventional raw materials which were essentially alkali-free apart from unavoidable impurities. The melt was refined at this temperature for one and a half hours, then transferred into inductively heated platinum crucibles and stirred at 1550° C. for 30 minutes for homogenization. The melts were poured into preheated graphite molds and cooled to room temperature.

The Table shows eight examples of glasses according to the invention listing their compositions (in % by weight, based on oxide) and their most important properties. The refining agent $SnO_2$ is present at a level of 0.5% by weight, but is not listed in the table. The following properties are listed:

the coefficient of thermal expansion $\alpha_{20/300}$ $[10^{-6}/K]$ the density $\rho$ $[g/cm^3]$ the dilatometric glass transition temperature $T_g$ [° C.] in accordance with DIN 52324 the temperature at a viscosity of $10^4$ dPas (referred to as T 4 [° C.])

the temperature at a viscosity of $10^2$ dPas (referred to as T 2 [° C.]), calculated with the Vogel-Fulcher-Tammann equation the refractive index $n_d$ an acid resistance "HCl" as weight loss (material removal value) from glass plates measuring 50 mm×50 mm×2 mm and polished on all sides after treatment with 5% strength hydrochloric acid for 24 hours at 95° C. $[mg/cm^2]$ the resistance to buffered hydrofluoric acid "BHF" as weight loss (material removal value) from glass plates measuring 50 mm×50 mm×2 mm and polished on all sides after treatment with 10% strength $NH_4F \cdot HF$ solution for 20 minutes at 23° C. $[mg/cm^2]$ the modulus of elasticity E [GPa].

TABLE

Examples 1–8: Compositions (in % by weight, based on oxide) and essential properties of glasses according to the invention.

| | 1 | 2 | 3 | 4 | 5 | 6 | 7 | 8 |
|---|---|---|---|---|---|---|---|---|
| $SiO_2$ | 61.3 | 61.3 | 61.3 | 63.0 | 59.0 | 60.9 | 63.8 | 62.7 |
| $B_2O_3$ | 8.0 | 8.0 | 7.8 | 10.0 | 10.0 | 8.0 | 6.1 | 8.0 |
| $Al_2O_3$ | 16.0 | 16.2 | 16.0 | 15.6 | 18.0 | 16.2 | 14.5 | 15.6 |
| MgO | 3.4 | 3.4 | 3.8 | 3.1 | 3.2 | 3.1 | 5.5 | 3.2 |
| CaO | 7.5 | 7.3 | 7.3 | 4.6 | 4.6 | 8.2 | 5.8 | 5.0 |
| SrO | — | 0.8 | — | 1.3 | 2.0 | — | — | — |
| BaO | 3.3 | 2.5 | 3.3 | 1.9 | 2.7 | 3.1 | 3.5 | 5.0 |
| ZnO | — | — | — | — | — | — | 0.3 | — |
| $\alpha_{20/300}$ $[10^{-6}/K]$ | 3.74 | 3.70 | 3.71 | 3.35 | 3.52 | 3.80 | 3.69 | 3.50 |
| $\rho$ $[g/cm^3]$ | 2.49 | 2.49 | 2.49 | 2.42 | 2.46 | 2.48 | 2.48 | 2.48 |
| $T_g$ [° C.] | 709 | 708 | 716 | 704 | 711 | 713 | 714 | 713 |
| T 4 [° C.] | 1262 | 1265 | 1260 | 1277 | 1258 | 1259 | 1273 | 1286 |
| T 2 [° C.] | 1619 | 1617 | 1630 | 1646 | 1609 | 1613 | 1631 | 1648 |
| $n_d$ | 1.524 | 1.524 | 1.524 | 1.513 | 1.521 | 1.525 | 1.518 | 1.518 |
| HCl $[mg/cm^2]$ | 0.34 | 0.49 | 0.38 | n.m. | n.m. | 0.42 | 0.15 | 0.38 |
| BHF $[mg/cm^2]$ | n.m. | n.m. | n.m. | 0.67 | 0.79 | 0.69 | 0.74 | 0.68 |
| E [GPa] | 79 | 79 | 79 | 76 | 77 | 79 | 80 | 76 | n.m. = not measured

As the examples illustrate, the glasses according to the invention have the following advantageous properties:

A thermal expansion $\alpha_{20/300}$ of $2.8 \times 10^{-6}/K$ to $3.9 \times 10^{-6}/K$, similar to the expansion behavior of both amorphous silicon and increasingly polycrystalline silicon.

A high heat resistance wherein the glass transition temperature is $T_g \geq 690°$ C. This is important for achieving low compaction during production and for making the glasses useful as substrates to be coated with amorphous Si layers and their subsequent annealing.

A low density wherein $\rho < 2.6$ $g/cm^3$.

A high mechanical strength wherein the E modulus is $E \geq 74$.

A temperature at a viscosity of $10^4$ dPas of at most 1350° C., and a temperature at a viscosity of $10^2$ dPas of at most 1720° C., which means a suitable viscosity characteristic line for the glasses with regard to hot-shaping and meltability. The glasses can be produced as flat glasses by various drawing methods, for example, microsheet down-draw, up-draw or overflow fusion methods, and in a preferred embodiment, if they are free from $As_2O_3$ and $Sb_2O_3$, also by the float process.

A high chemical resistance, as is evident from good resistance to hydrochloric acid ("acid resistance HCl" with a weight loss of $<0.7$ $mg/cm^2$) and to buffered hydrofluoric acid solution, which makes them sufficiently inert to the chemicals used in the production of flat-panel screens.

A low refractive index wherein $n_d < 1.54$, preferably $\leq 1.531$. This property is the physical prerequisite for a high transmission.

The glasses have high thermal shock resistance and good devitrification stability.

The glasses are thus highly suitable for use as substrate glass in display technology, in particular for TFT displays, and in thin-film photovoltaics.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An alkali-free aluminoborosilicate glass consisting of by weight % based on oxide,

| | |
|---|---|
| $SiO_2$ | >58–65, |
| $B_2O_3$ | >6–11.5, |
| $Al_2O_3$ | >14–20, |
| MgO | >3–6, |
| CaO | >4.5–10, |
| SrO | 0–1.5, |
| BaO | >1.5–6, |
| with SrO + BaO | >3, and |
| ZnO | 0–<2. | and essentially no alkali oxides.

2. An alkali-free aluminoborosilicate glass consisting of by weight % based on oxide,

| | |
|---|---|
| $SiO_2$ | >58–65, |
| $B_2O_3$ | >6–11.5, |
| $Al_2O_3$ | >14–20, |
| MgO | >3–6, |
| CaO | >4.5–10, |
| SrO | 0–<4, |
| BaO | >2.5–6, |
| with SrO + BaO | >3, and |
| ZnO | 0–0.5. | and essentially no alkali oxides.

3. An aluminoborosilicate glass according to claim 1, containing at most 5% by weight MgO based on oxide.

4. An aluminoborosilicate glass according to claim 1, containing at least 60% by weight $SiO_2$ based on oxide.

5. An aluminoborosilicate glass according to claim 1, containing more than 11% by weight MgO, CaO, SrO and BaO together based on oxide.

6. An aluminoborosilicate glass according to claim 1, having a ratio of MgO/CaO by weight of less than 1.

7. An aluminoborosilicate glass according to claim 1, having a ratio of MgO/CaO by weight of less than 0.7.

8. An aluminoborosilicate glass according to claim 1, containing at least 5% by weight CaO based on oxide.

9. An aluminoborosilicate glass according to claim 1, containing >7 to ≦11% by weight $B_2O_3$ based on oxide.

10. An aluminoborosilicate glass according to claim 1, containing >2.5% to ≦5% by weight BaO based on oxide.

11. An alkali-free aluminoborosilicate glass consisting of by weight % based on oxide,

| | |
|---|---|
| $SiO_2$ | >58–65, |
| $B_2O_3$ | >6–11.5, |
| $Al_2O_3$ | >14–20, |
| MgO | >3–6, |
| CaO | >4.5–10, |
| SrO | 0–1.5, |
| BaO | >1.5–6, |
| with SrO + BaO | >3, and |
| ZnO | >0–≦0.5, | and essentially no alkali oxides.

12. An alkali-free aluminoborosilicate glass consisting of by weight % based on oxide,

| | |
|---|---|
| $SiO_2$ | >58–65, |
| $B_2O_3$ | >6–11.5, |
| $Al_2O_3$ | >14–20, |
| MgO | >3–6, |
| CaO | >4.5–10, |
| SrO | 0–1.5, |
| BaO | >1.5–6, |
| with SrO + BaO | >3, and |
| ZnO | >0–≦1.5, | and essentially no alkali oxides.

13. An alkali-free aluminoborosilicate glass consisting of by weight % based on oxide,

| | |
|---|---|
| $SiO_2$ | >58–65, |
| $B_2O_3$ | >6–11.5, |
| $Al_2O_3$ | >14–20, |
| MgO | >3–6, |
| CaO | >4.5–10, |
| SrO | 0–1.5, |
| BaO | >1.5–6, |
| with SrO + BaO | >3, |
| ZnO | 0–<2, |
| $ZrO_2$ | ≦0.5, and |
| $TiO_2$ | ≦0.5, | and essentially no alkali oxides.

14. An aluminoborosilicate glass according to claim 2, containing at most 5% by weight MgO based on oxide.

15. An aluminoborosilicate glass according to claim 2, containing at least 60% by weight $SiO_2$ based on oxide.

16. An aluminoborosilicate glass according to claim 2, containing more than 11% by weight based on oxide MgO, CaO, SrO and BaO is greater together.

17. An aluminoborosilicate glass according to claim 2, having a ratio of MgO/CaO by weight of less than 1.

18. An aluminoborosilicate glass according to claim 2, having a ratio of MgO/CaO by weight of less than 0.7.

19. An aluminoborosilicate glass according to claim 2, containing at least 5% by weight CaO based on oxide.

20. An aluminoborosilicate glass according to claim 2, containing >7 to ≦11% by weight $B_2O_3$ based on oxide.

21. An aluminoborosilicate glass according to claim 2, containing >2.5% to ≦5% by weight BaO based on oxide.

22. An alkali-free aluminoborosilicate glass consisting of by weight % based on oxide,

| | |
|---|---|
| $SiO_2$ | >58–65, |
| $B_2O_3$ | >6–11.5, |
| $Al_2O_3$ | >14–20, |
| MgO | >3–6, |
| CaO | >4.5–10, |
| SrO | 0–<4, |
| BaO | >2.5–6, |
| with SrO + BaO | >3, and |
| ZnO | >0–≦0.5, | and essentially no alkali oxides.

23. An alkali-free aluminoborosilicate glass consisting of by weight % based on oxide,

| | |
|---|---|
| $SiO_2$ | >58–65, |
| $B_2O_3$ | >6–11.5, |
| $Al_2O_3$ | >14–20, |
| MgO | >3–6, |
| CaO | >4.5–10, |
| SrO | 0–1.5, |
| BaO | >1.5–6, |
| with SrO + BaO | >3, and |
| ZnO | >0–≦2.0, | and essentially no alkali oxides.

24. An alkali-free aluminoborosilicate glass consisting of by weight % based on oxide,

| | |
|---|---|
| $SiO_2$ | >58–65, |
| $B_2O_3$ | >6–11.5, |
| $Al_2O_3$ | >14–20, |
| MgO | >3–6, |
| CaO | >4.5–10, |
| SrO | 0–<4, |
| BaO | >2.5–6, |
| with SrO + BaO | >3, |
| ZnO | 0–0.5, |
| $ZrO_2$ | ≦0.5, and |
| $TiO_2$ | ≦0.5, | and essentially no alkali oxides.

25. An aluminosilicate glass according to claim 2, containing up to 3% by weight SrO based on oxide.

26. A substrate glass in thin-film photovoltaics or a display comprising an alkali-free aluminoborosilicate glass according to claim 1.

27. A TFT display or a thin-Film solar cell comprising an alkali-free aluminoborosilicate glass according to claim 1.

28. A substrate glass in thin-film photovoltaics or a display comprising an alkali-free aluminoborosilicate glass according to claim 2.

29. A TFT display or a thin-film solar cell comprising an alkali-free aluminoborosilicate glass according to claim 2.

30. An aluminoborosilicate glass according to claim 1 that has a density of less than 2.6 g/cm³.

31. An alkali-free aluminoborosilicate glass consisting of by weight % based on oxide,

| | |
|---|---|
| $SiO_2$ | >58–65, |
| $B_2O_3$ | >6–11.5, |
| $Al_2O_3$ | >14–20, |
| MgO | >3–6, |

-continued

| | |
|---|---|
| CaO | >4.5–10, |
| SrO | 0–1.5, |
| BaO | >1.5–6, |
| with SrO + BaO | >3, |
| ZnO | 0–<2 |
| $ZrO_2$ | 0–2, |
| $TiO_2$ | 0–2, |
| With $ZrO_2$ + $TiO_2$ | 0–2, |
| $As_2O_3$ | 0–1.5, |
| $Sb_2O_3$ | 0–1.5, |
| $SnO_2$ | 0–1.5, |
| $CeO_2$ | 0–1.5, |
| $Cl^-$ | 0–1.5, |
| $F^-$ | 0–1.5, |
| $SO_4^{2-}$ | 0–1.5, and |
| Wherein $As_2O_3$ + $Sb_2O_3$ + $SnO_2$ + $CeO_2$ + $Cl^-$ + $F^-$ + $SO_4^{2-}$ | 0–1.5, | and essentially no alkali oxides.

32. An alkali-free aluminoborosilicate glass consisting of by weight % based on oxide,

| | |
|---|---|
| $SiO_2$ | >58–65, |
| $B_2O_3$ | >6–11.5, |
| $Al_2O_3$ | >14–20, |
| MgO | >3–6, |
| CaO | >4.5–10, |
| SrO | 0–<4, |
| BaO | >2.5–6, |
| with SrO + BaO | >3, |
| ZnO | 0–0.5, |
| $ZrO_2$ | 0–2, |
| $TiO_2$ | 0–2, |
| With $ZrO_2$ + $TiO_2$ | 0–2, |
| $As_2O_3$ | 0–1.5, |
| $Sb_2O_3$ | 0–1.5, |
| $CeO_2$ | 0–1.5, |
| $Cl^-$ | 0–1.5, |
| $F^-$ | 0–1.5, |
| $SO_4^{2-}$ | 0–1.5, and |
| Wherein $As_2O_3$ + $Sb_2O_3$ + $CeO_2$ + $Cl^-$ + $F^-$ + $SO_4^{2-}$ | 0–1.5, | and essentially no alkali oxides.

33. An alkali-free aluminoborosilicate glass consisting of by weight % based on oxide,

| | |
|---|---|
| $SiO_2$ | >58–65, |
| $B_2O_3$ | >6–11.5, |
| $Al_2O_3$ | >14–20, |
| MgO | >3–6, |
| CaO | >4.5–10, |
| SrO | 0–1.5, |
| BaO | >1.5–6, |
| with SrO + BaO | >3, |
| ZnO | 0–<2, |
| $TiO_2$ | 0–2, |
| $As_2O_3$ | 0–1.5, |
| $Sb_2O_3$ | 0–1.5, |
| $CeO_2$ | 0–1.5, |
| $Cl^-$ | 0–1.5, |
| $F^-$ | 0–1.5, |
| $SO_4^{2-}$ | 0–1.5, and |
| Wherein $As_2O_3$ + $Sb_2O_3$ + $CeO_2$ + $Cl^-$ + $F^-$ + $SO_4^{2-}$ | 0–1.5, | and essentially no alkali oxides, and does not contain $SnO_2$ and $ZrO_2$.

34. An alkali-free aluminoborosilicate glass consisting of by weight % based on oxide,

| | |
|---|---|
| $SiO_2$ | >58–65, |
| $B_2O_3$ | >6–11.5, |
| $Al_2O_3$ | >14–20, |
| MgO | >3–6, |
| CaO | >4.5–10, |
| SrO | 0–<4, |
| BaO | >2.5–6, |
| with SrO + BaO | >3, |
| ZnO | 0–0.5, |
| $TiO_2$ | 0–2, |
| $As_2O_3$ | 0–1.5, |
| $Sb_2O_3$ | 0–1.5, |
| $CeO_2$ | 0–1.5, |
| $Cl^-$ | 0–1.5, |
| $F^-$ | 0–1.5, |
| $SO_4^{2-}$ | 0–1.5, and |
| Wherein $As_2O_3$ + $Sb_2O_3$ + $CeO_2$ + $Cl^-$ + $F^-$ + $SO_4^{2-}$ | 0–1.5, | and essentially no alkali oxides, and does not contain $SnO_2$ and $ZrO_2$.

35. An alkali-free aluminoborosilicate glass consisting of by weight % based on oxide,

| | |
|---|---|
| $SiO_2$ | >58–65, |
| $B_2O_3$ | >6–11.5, |
| $Al_2O_3$ | >14–20, |
| MgO | >3–6, |
| CaO | >4.5–10, |
| SrO | 0–1.5, |
| BaO | >1.5–6, |
| with SrO + BaO | >3, |
| ZnO | 0–<2, |
| $TiO_2$ | 0–2, |
| $As_2O_3$ | 0–1.5, |
| $Sb_2O_3$ | 0–1.5, |
| $Cl^-$ | 0–1.5, |
| $F^-$ | 0–1.5, |
| $SO_4^{2-}$ | 0–1.5, and |
| Wherein $As_2O_3$ + $Sb_2O_3$ + $Cl^-$ + $F^-$ + $SO_4^{2-}$ | 0–1.5, | and essentially no alkali oxides, and does not contain $SnO_2$ and $ZrO_2$.

36. An alkali-free aluminoborosilicate glass consisting of by weight % based on oxide,

| | |
|---|---|
| $SiO_2$ | >58–65, |
| $B_2O_3$ | >6–11.5, |
| $Al_2O_3$ | >14–20, |
| MgO | >3–6, |
| CaO | >4.5–10, |
| SrO | 0–<4, |
| BaO | >2.5–6, |
| with SrO + BaO | >3, |
| ZnO | 0–0.5, |
| $TiO_2$ | 0–2, |
| $As_2O_3$ | 0–1.5, |
| $Sb_2O_3$ | 0–1.5, |
| $Cl^-$ | 0–1.5, |
| $F^-$ | 0–1.5, |
| $SO_4^{2-}$ | 0–1.5, and |
| Wherein $As_2O_3$ + $Sb_2O_3$ + $Cl^-$ + $F^-$ + $SO_4^{2-}$ | 0–1.5, | and essentially no alkali oxides, and does not contain $SnO_2$ and $ZrO_2$.

* * * * *

UNITED STATES PATENT AND TRADEMARK OFFICE
CERTIFICATE OF CORRECTION

PATENT NO.    : 6,858,552 B2
DATED         : February 22, 2005
INVENTOR(S)   : Ulrich Peuchert It is certified that error appears in the above-identified patent and that said Letters Patent is hereby corrected as shown below:

Column 8,
Line 50, reads "thin-Film" should read -- thin-film --.

Column 9,
Line 12, delete "SnO2 [tab] 0-1.5,"
Line 17, delete "SnO$_2$ +".

Signed and Sealed this

Twenty-eighth Day of June, 2005

JON W. DUDAS
*Director of the United States Patent and Trademark Office*